UNITED STATES PATENT OFFICE.

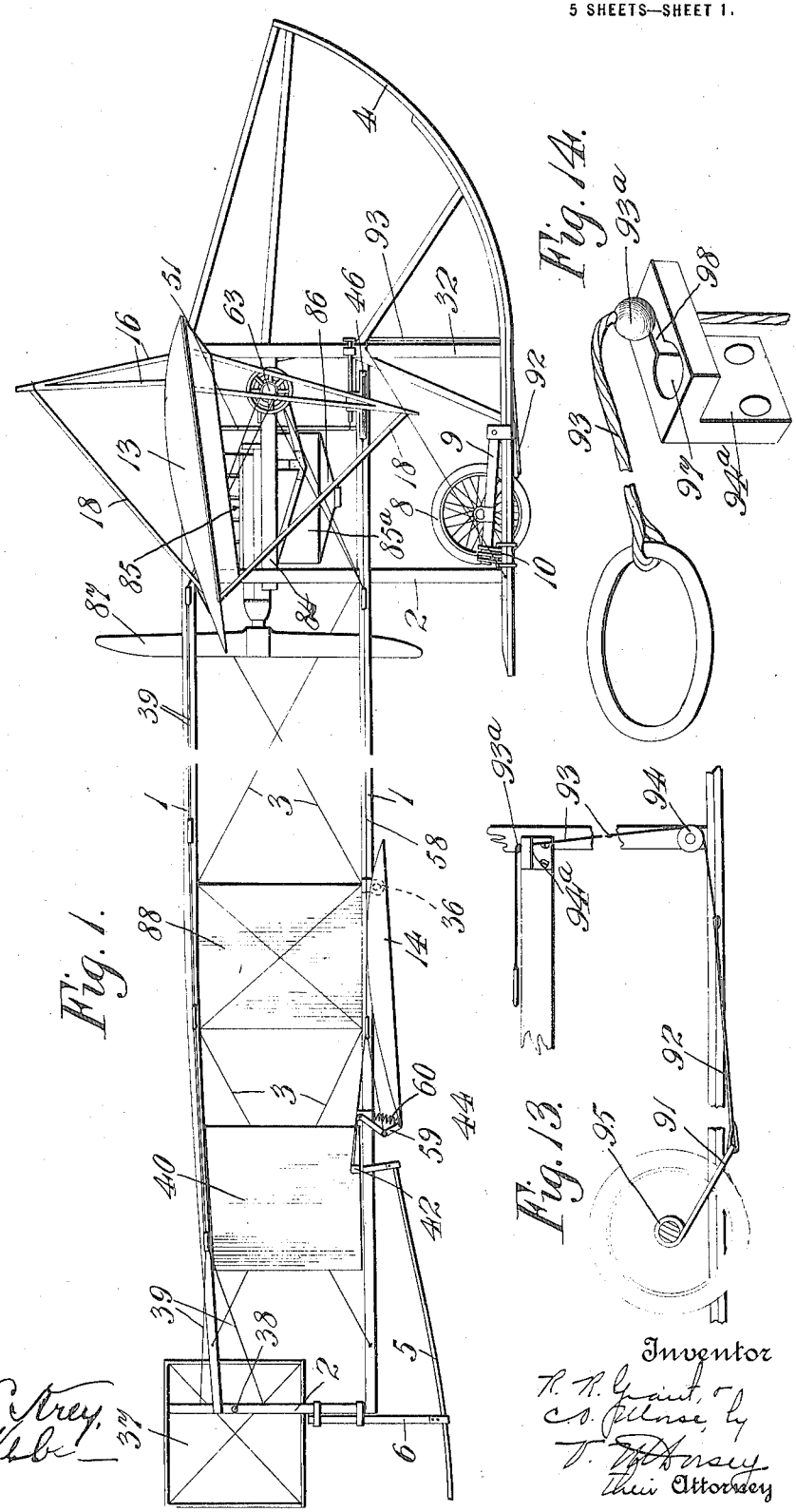

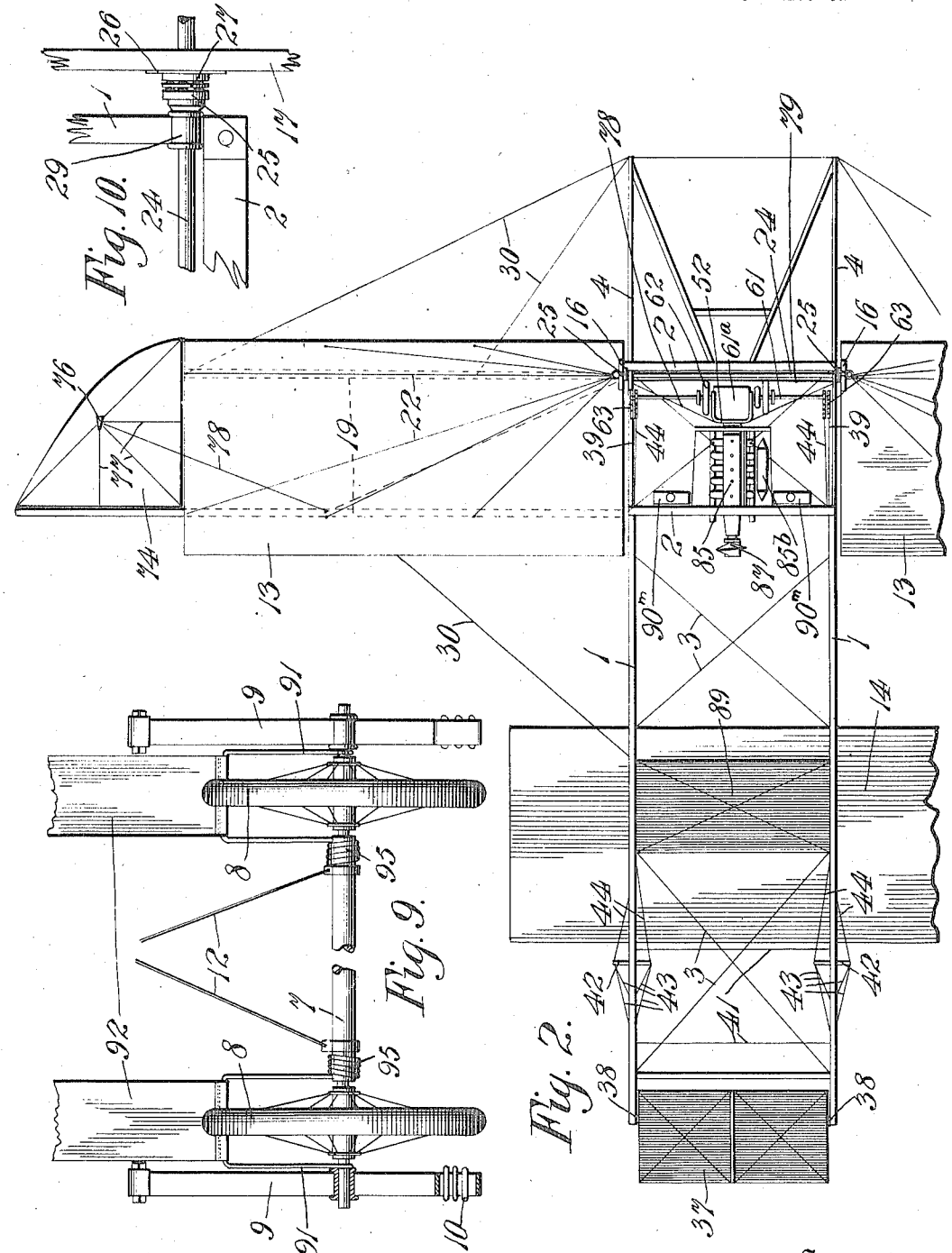

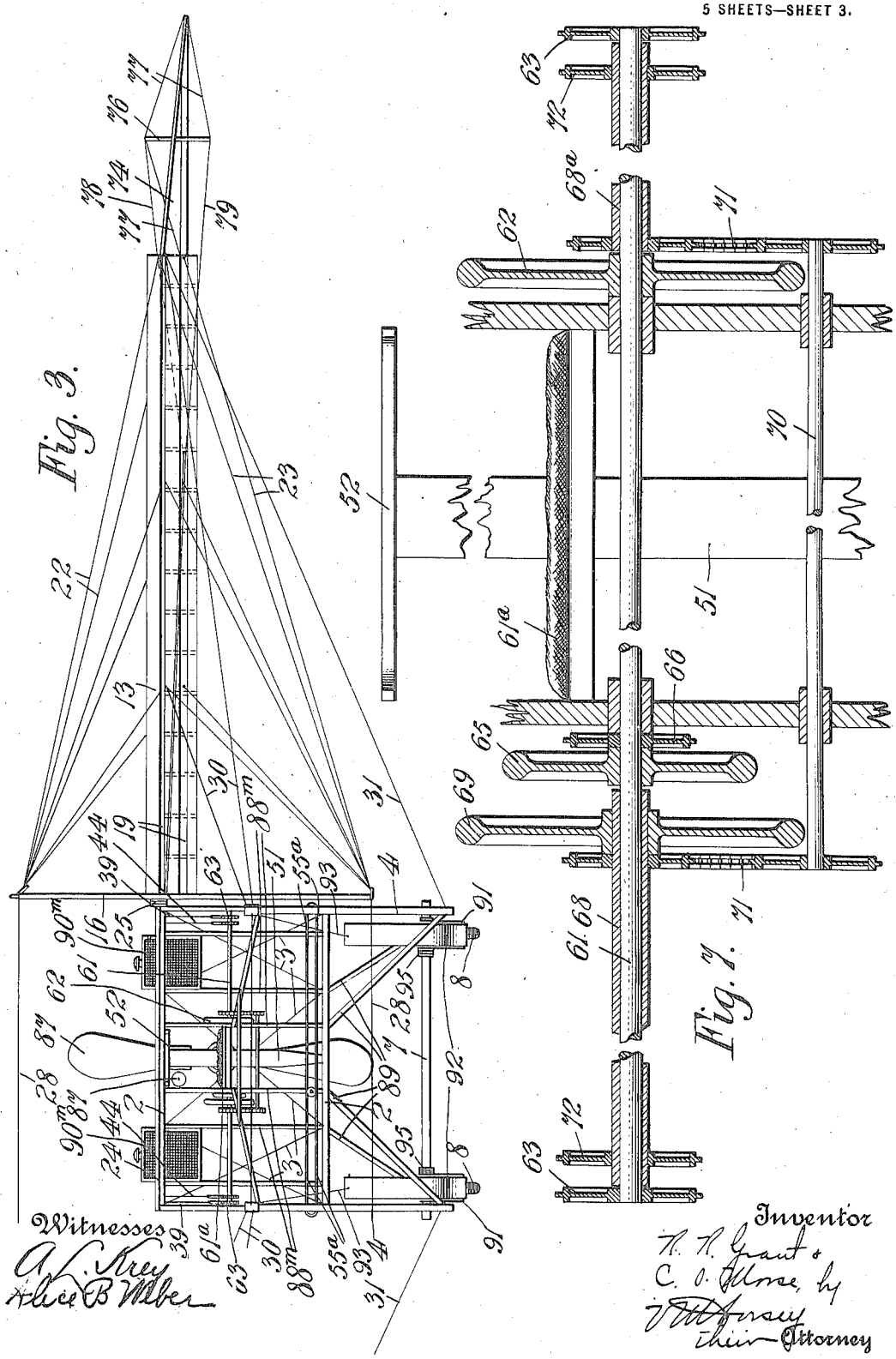

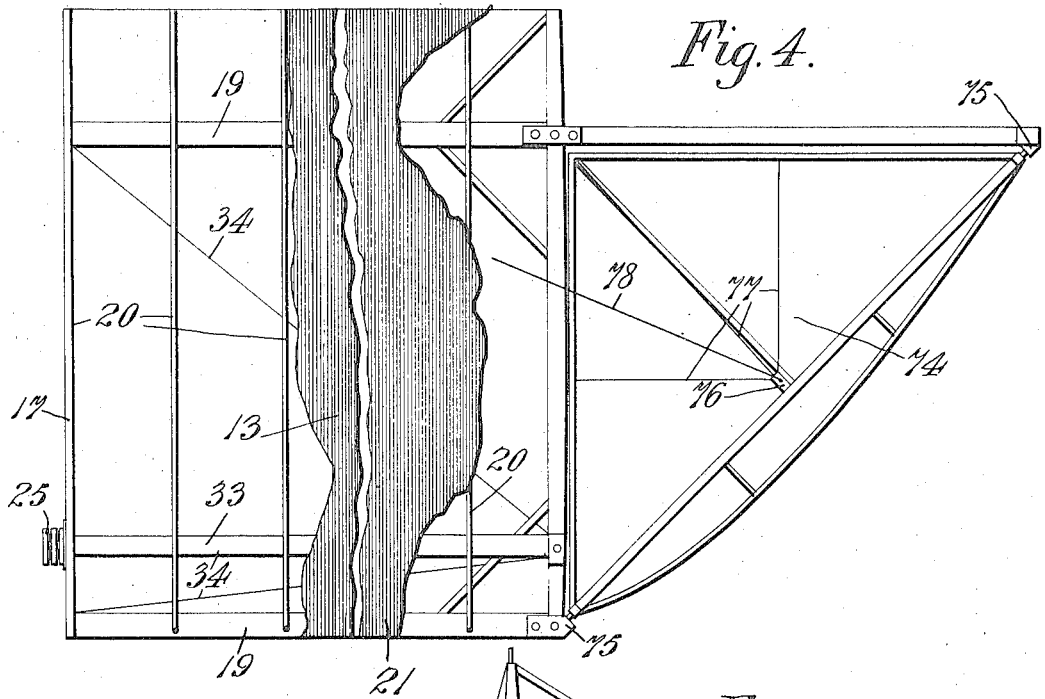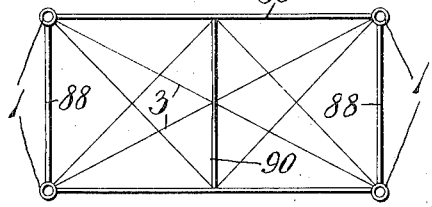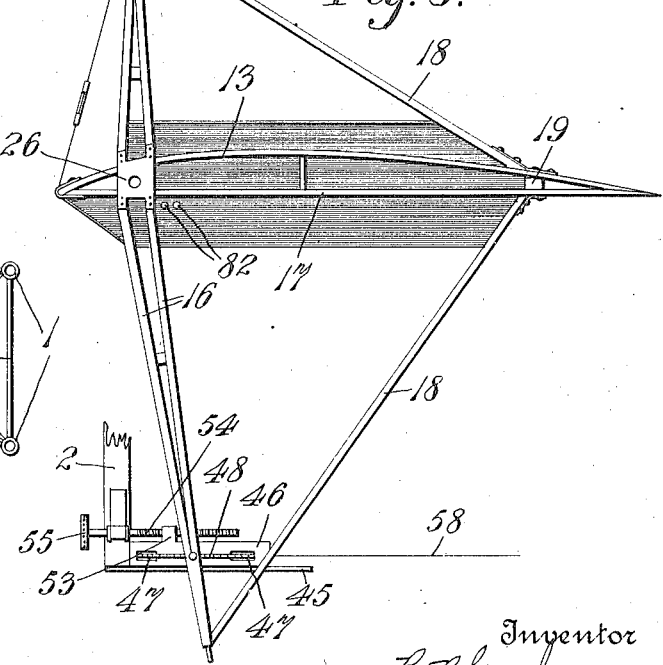

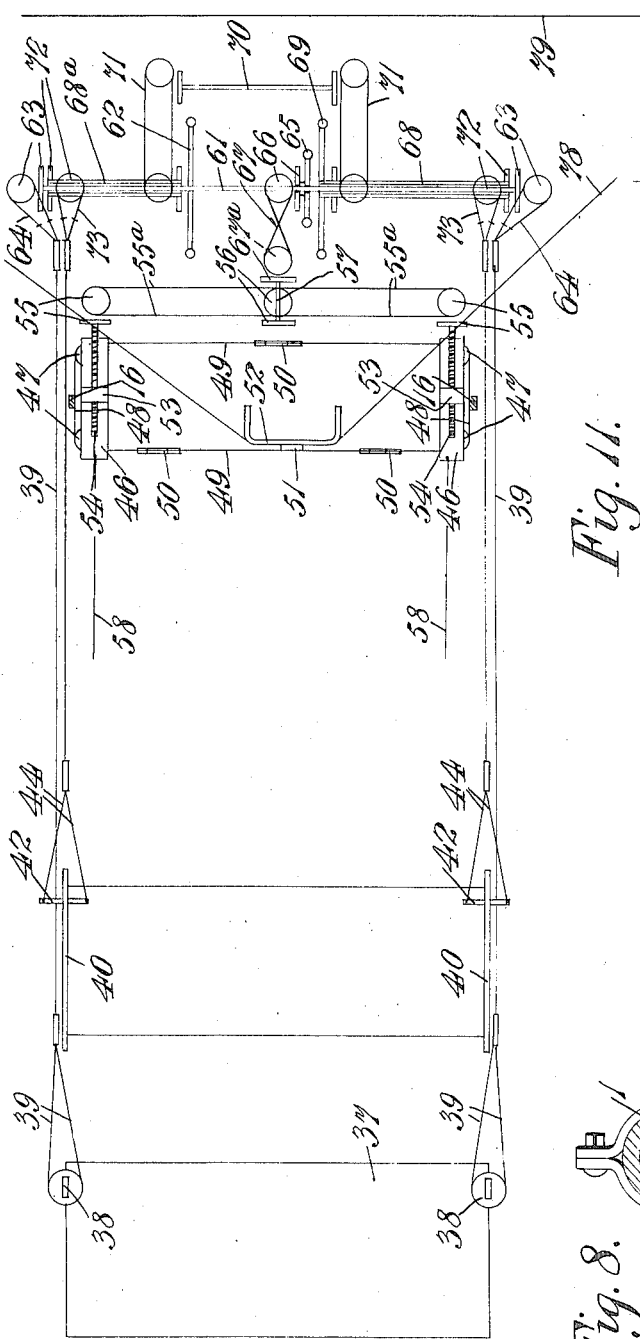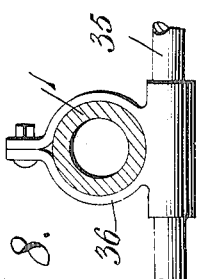

RUDOLPH R. GRANT AND CHARLES O. MORSE, OF NORFOLK, VIRGINIA, ASSIGNORS, BY DIRECT AND MESNE ASSIGNMENTS, TO VERNON M. DORSEY, TRUSTEE, OF WASHINGTON, DISTRICT OF COLUMBIA.

AEROPLANE.

1,263,757.

Specification of Letters Patent.  Patented Apr. 23, 1918.

Application filed February 6, 1912. Serial No. 675,893.

*To all whom it may concern:*

Be it known that we, RUDOLPH R. GRANT and CHARLES O. MORSE, both citizens of the United States of America, and residents of the city of Norfolk, State of Virginia, have invented certain new and useful Improvements in Aeroplanes, of which the following is a specification.

The object of our invention is to provide a construction in aeroplanes in which the angle of incidence of the supporting surfaces as a whole may be similarly varied to cause variation in the lift and drift and inversely varied for lateral control. By "angle of incidence" as here used, we mean to describe the angle existing between the line of effort of the driving means and the angle of the supporting surfaces. This shifting of the angle of incidence of the supporting surfaces as a whole involves numerous features of construction which we believe to be essential to avoid the difficulties which have heretofore in aeroplane construction, to a great extent, caused the warping of part only of the supporting surfaces, which partial warping is necessarily limited in its effect. The changes in the angle of incidence, above referred to, are, for both purposes, at all times under the control of the aviator and the construction employed is such that it is susceptible of embodiment in machines greatly differing in construction without change of the principle employed.

It further consists in the use of a plurality of front sustaining surfaces or planes separated laterally from each other by an unobstructed opening, in the rear of which opening and lower than the front supporting surfaces or planes is located the following or rear supporting surface or plane, the said surfaces being so positioned vertically and longitudinally that their combined center of lifting effort is coincided with or slightly above and forward of the center of gravity of the machine, the first insuring a slight pressure on the elevator and the latter insuring stability. These sustaining planes are all capable of simultaneous change in their angle of incidence, while the two front sustaining planes, are as stated, capable of independent and reverse changes in their angle of incidence.

The sustaining planes are so shaped and mounted that their line of pressure is located slightly in the rear of their pivotal axes, this being true at all angles from zero to the maximum angle at which they are used. As a result of this construction the planes constantly tend to move toward their neutral position in which their lifting effort is zero. The sustaining surfaces moreover are so designed that with an increase in the angle of incidence the center of pressure thereof moves farther away (*i. e.*, rearwardly) from their pivots, whereby in case of reverse changes in the position of the surfaces, that surface which is at the greater angle of incidence will, by a balancing connection between it and the other front sustaining surface, overpower the opposite but lesser turning movement upon the last named surface and tend to restore that surface to a predetermined balanced condition, which depends upon the setting of certain selective mechanisms by the aviator. We thus provide an automatic lateral equalizing system between the front sustaining surfaces, upon which we superimpose a selective control worked by the aviator through the same system of connections for effecting at will a reverse change in the angle of incidence of the two front sustaining surfaces.

Between the front sustaining surfaces is hung the fuselage of skeleton construction, whereby an unobstructed space between the front sustaining surfaces is provided, the fuselage carrying the power plant, rear sustaining surfaces, and all parts which are in the rear of the forward planes and also the landing skids. The change in the angle of incidence of the sustaining surfaces is effected by an angular movement of such planes around the axes which connect them with the fuselage. In the forward end of the fuselage is mounted the operator's seat, and the control system for the various sustaining surfaces, elevators, rudders and power plants, and rotating within the open fuselage is the propeller located close to, but in the rear of the center of gravity, the propeller thus taking air which passes through the open fuselage and thereby tending to recover in the rear of the point of greatest resistance, any "drag" that may exist therefrom. The skeleton construction of the fuselage and its location between the forward sustaining surfaces provides a stabilizing element comparable to the center opening in a parachute, tending to steady the machine, especially in gliding. In the rear of the fuselage is located an elevator and immediately in front thereof the rudder or rudders, these being placed above the rear sustaining surface, which is pivoted to the lower part of the fuselage.

Our invention further provides for avoiding the deleterious effects upon the rear surfaces of the turbulent condition of the air in the rear of the propellers and also for neutralizing by the same means the torque of the engine, that is to say the twisting reaction of the propeller blades upon the air. For this purpose we place behind the propeller and in front of the elevator and rudders a cellular structure, the walls of which are so designed and placed as to receive the thrust of the rotating body in the rear of the propeller and to transmit it to the frame of the machine in such manner that it tends to neutralize the effect of the torque reaction between the propeller and the air and also to suppress eddy currents and cause the air to pass to the elevator and rudder in a comparatively straight and undisturbed condition. The outer vertical surfaces of this cellular structure also by their reaction upon the surrounding air serve to dampen the gyratory tendency of the machine around its own center of gravity, such surfaces being very effective for this purpose due to their distance from that point, and being in the rear thereof, also serve as means to stabilize the machine directionally. These cellular surfaces and the rear rudder are well situated to cause the machine to recover when tending to slide off on a turn when banking.

In addition to the reverse changes in the angle of incidence of the front supporting surfaces, for the purpose of lateral control, we provide upon the ends thereof ailerons pivoted on horizontal axes inclined to the line of drift, whereby the axes of such ailerons are more or less normal to the resultant of the air pressure due to both the drift and side wind reaction. It is preferred that the forward edges of these ailerons be of a general curve so calculated that the entering edge at all points is substantially normal to the resultant pressures of both the drift and side winds within predetermined limits. The control system of these ailerons is preferably tied into the system which controls the lateral stabilizing change of the angle of incidence of the front supporting surfaces, so that a simultaneous movement with predetermined relations exists between the tilting of such aileron and the lateral stabilizing change in the angle of incidence of the wings to which it is attached.

The curvature of the skid landing system is so calculated that its center of curvature is located above and in front of the center of gravity of the machine so that upon landing there will be no tendency of the machine to pitch forward over its head, but on the contrary, when skidding, the rear part of the machine will settle. This results in the projection of the skids to some distance in front of the pivotal point of the front sustaining surfaces, and permits bracing from such surfaces on the axis of their pivotal points forwardly to the skid system, thereby taking up the drift pressure upon such surfaces.

It further consists in the landing system comprising a single truck laterally braced but yet having limited movement in respect to the skid frame, the connection being such as to give a high amount of resiliency with the use of a comparatively small amount of rubber.

Our invention further consists in the construction, arrangement and combination of the several parts of which it is composed as will be hereinafter more fully described and claimed.

Referring to the accompanying drawings in which corresponding parts are designated by corresponding marks of reference:

Figure 1 is a side elevation of a monoplane embodying our invention.

Fig. 2 is a partial plan view of the machine shown in Fig. 1 and on the same scale.

Fig. 3 is a front elevation with one front supporting plane removed.

Fig. 4 is a plan on an enlarged scale showing a framing of one of the front supporting surfaces.

Fig. 5 is an end view of a forward supporting surface showing the strut structure thereof in elevation and a part of the mechanism for changing the angle of incidence thereof.

Fig. 6 is a view of the control system, partly diagrammatic, certain parts of the control system being displaced for the purpose of clearness of showing.

Fig. 7 is a section of a part of such control system.

Fig. 8 is a detail view partly in section showing one of the adjustable clamping collars in which the rear supporting surface is pivoted.

Fig. 9 is a fragmental plan view of landing system.

Fig. 10 is a detail of the bearing of a forward supporting plane.

Fig. 11 shows the development of the cissoid upon which I prefer to construct the curve of the supporting surfaces.

Fig. 12 is a front elevation of the cellular structure designed to neutralize the torque of the engine and to destroy eddy currents arising from the propeller.

Fig. 13 is a diagrammatic side elevation of a brake mechanism.

Fig. 14 is a detail perspective view of a catch-bracket for the brake-halyard.

The fuselage proper consists of two top and two bottom longitudinal members 1, one at each longitudinal edge, connected at intervals by the vertical and horizontal struts 2 and the diagonal stays 3, arranged both in vertical and horizontal planes, and diagonally across the cross section of the fuselage, by which the latter is formed into an elongated truss substantially in the general shape of a rectangular parallelogram, all parts of which are rigidly braced together. The specific form of construction employed to constitute a fuselage of this general character is immaterial as far as affects the scope of our invention.

The landing system employed comprises a forward and a rearward element. The forward element consists of a pair of runners 4 each of which is detachably connected to the corresponding side of the fuselage, the forward ends of the runners being on a curve struck from a center located above and forward of the center of gravity of the machine as will be hereinafter more fully referred to. The rear landing system consists of a pair of skids 5, each of which is detachably connected to the corresponding side of the rear of the fuselage by posts 6.

A truck comprising a transverse axle 7, having on each of its opposite ends a wheel 8, mounted on the forward landing structure by the links 9, one end of each of which is pivoted to the corresponding runner and the opposite end of which is connected to such runner by a resilient connection 10, such as spring bands. The links receive intermediate of their length the corresponding ends of the axle 7 whereby the resiliency which is necessary to effect a landing without excessive shock is provided for by the power of the springs as modified by the system of levers employed. The wheels 8 are located forwardly of the center of gravity of the machine so that the machine in settling will fall rearwardly not forwardly. Attached to the axle on the inside of the opposite wheels thereof, are stays 12, which are led diagonally across the front banding system, to which their front ends are attached. The lateral movement of the wheels in landing is resiliently opposed by the springs 10, which tend to draw the wheels back into their proper lateral position, the cross stays forming positive limits for such lateral movement, they being put in with a certain amount of slack. It will be noted that the truck itself is held from slewing, that is to say one wheel is prevented from running ahead of the other by the links 9 which determine the longitudinal relation of the ends of the shaft 4 to the skid.

The main supporting surfaces are shown as three in number (as a monoplane is shown), that is they consist of the two forward surfaces 13 which are identical in construction and are placed on opposite sides of the fuselage, being separated by the unobstructed opening formed by the skeleton construction of the latter, and the rear supporting surface 14 beneath the fuselage in the rear of the first named surfaces and centrally of the opening between them, this giving a continuous entering edge throughout the width of the machine. All of these surfaces are pivoted in respect to the fuselage and the construction of the front and rear surfaces varies according to the mountings which are employed with them.

Each front supporting surface, comprises a framed, practically horizontal portion having upon its inner edge a vertical system of struts formed substantially at right angles thereto and projecting below and above the same. The strut structure comprises a main vertical member 16 and a main horizontal member 17, which for the purpose of strength may each be in two parts separated by spacers, such members being connected by diagonal braces 18. From the horizontal member 17 of the strut structure projects at right angles thereto the lateral frame beams 19 of the corresponding supporting surface, these lateral beams being connected at intervals by ribs 20 over which suitable fabric 21 is placed to form the skin of the lifting surface and to reduce air friction. The supporting planes are tied to the ends of the strut structure by laterally inclined stay wires, the stays 22 leading from the upper part of the strut structure serving to take up the weight of the wings and the momentum thereof upon the sudden arrest of the machine, while the stays 23 leading to the lower part of the strut structure serve to brace the wings against reaction of the air due to the lifting effort thereof.

Across the top of the fuselage is situated the lateral tubular thrust bar 24, on the opposite ends of which the two forward supporting planes are mounted by means of the bearings shown in detail in Fig. 10, each of which consists in a thrust collar 25 upon the end of the bar and a corresponding thrust plate 26, located on the inner face of the strut structure, the end of the thrust bar entering an aperture in the last named thrust plate, while a suitable ball or roller cage 27 is interposed between the thrust collar and plate. The location of the pivots for these forward planes is so placed in respect thereto that at all angles of incidence used in flight such pivots are slightly in front of the center of pressure of lifting effort on the plane. The function accomplishing this will be hereinafter described.

The upper and lower ends of the strut structures of the two forward planes are connected together across the center of the machine by the strain transmitting stays 28. By the connections above described the lifting effort on one plane is balanced against that on the other.

The fuselage is supported by yokes 29, or other suitable means from and below the lateral thrust bar forming the axis upon which the front supporting planes are pivoted. The angular position of the fuselage in respect to these planes is controlled by mechanism which will be hereinafter described. In order to brace the forward planes against fore and aft movements and vertical movement upon their pivot, stay wires 30 extend from each plane at points along the axial line of the pivot thereof to the prow of the skid system and rearwardly to the fuselage. The staying of the planes by the stays 28 as hereinbefore described provides for the balancing of one plane against the other and preserves practically constant the alinement of or the lateral angle existing between, the planes. A further stay 31 extends from the outer end of each plane in the line of pivot to the bottom of the front vertical post 32 of the skid system, this location of the point of attachment of the stays 31 to the skid structure providing for a proper transmittal of the strains back to the fuselage. The system of bracing between the fuselage and its skid structure on the one hand, and the outer ends of the planes on the other, as here described, does not interfere with the tilting of the wing upon its pivotal point to effect a change in the angle of incidence.

This system of staying results in the lifting effort on the front surfaces being transmitted to the bearings in the form of inwardly acting compression strains which are exerted lengthwise of the supporting surfaces and the frames of such front supporting surfaces are properly designed to take up these stresses. Means for accomplishing this are shown in Fig. 4, in which the frame has located therein in the line of its pivotal axis a post 33, the outer end of which is tied back to the inner ends of the two lateral beams 19 of the supporting surface frame by diagonal tension stays 34, by which means the horizontal member of the strut framing is relieved of transverse strains which it would otherwise be called upon to carry between its ends and the pivotal point of the surface.

The rear supporting surface 14 is also pivoted slightly in advance of its center of lifting effort, beneath the fuselage, by an axis 35 having bearings in collars 36 capable of being clamped upon the lower longitudinal members of the fuselage at points along their length as may be desired. By this construction the position of such rearward supporting surfaces may be shifted forwardly and rearwardly on the fuselage to conform to variation in the center of gravity in the machine caused by different loadings. The angular position of such rearward surface in respect to the fuselage is capable of adjustment by mechanism hereinafter described.

The rear supporting surface has a lateral breadth or length of entering edge somewhat greater than the intervals between the forward supporting surfaces in order to obtain the same effective lift as would be due to an uninterrupted surface having the same length of edge as the total distance between the outer ends of the forward surface, the excess length on the rearward surface being necessary to counteract the loss from end leakage at the interruption of the forward planes. This also has the effect of slightly increasing the length of the entering edge.

Mounted in the extreme rear end of the fuselage is an elevator 37, shown in the form of two flat planes connected to move together on the horizontal axis 38 and controlled by the wires 39 which lead through fair leaders upon the outside of the upper longitudinal members of the fuselage to the forward part thereof where they are connected with the control mechanism to be hereinafter described. These wires are in duplicate and on opposite sides of the fuselage as a safeguard.

In front of the elevator and inside of the fuselage structure is a balanced rudder 40, consisting of two vertical planes, each of which is mounted between a pair of longitudinal members 1 of the fuselage, there being thus a rudder surface on each side thereof. These rudder planes are connected together at their front and rear edges by the transverse wires 41 tying them together and causing them to move in unison. Each rudder has located at its pivotal point on its lower edge a yoke 42 which is braced to the rudder by stays 43 and from which a pair of rudder-controlled wires 44 are led forward along the corresponding lower longitudinal member of the fuselage to the front thereof, where they are connected with the controlling mechanism to be hereinafter described. This provides a duplication of the rudder-controlled wires as matter of safety.

Rigidly carried in the forward end of the fuselage on the outside of each bottom longitudinal member 2 thereof is a fore and aft guide member 45 in which is mounted to longitudinally slide a traveler 46. Each traveler has on its opposite ends guide pulleys 47 over which pass a sprocket chain 48, the bight of the chain between the pulleys lying upon the outside of the traveler and upon the outside surfaces of the fuselage, one of the links of the bight of the chain being connected with the lower end of the vertical member 16 of the strut structure of the corresponding forward supporting surface. The sprocket chains 48 upon the opposite sides of the fuselage are connected across the same by suitable connections 49 provided with turn-buckles 50 whereby they may be properly tightened and adjusted, and the rear one of such cross connections is connected with the lower end of a lever 51 which is pivoted intermediate of its length and extends up behind the aviator's seat, where it is provided with a yoke 52 to receive his shoulders. By this construction a swaying of the aviator's body from side to side results in a movement of the sprocket chains 48 upon the pulleys on the travelers and causes a reverse but similar movement of the forward supporting surface in respect to each other and to the fuselage, whereby the angle of incidence of such supporting surface may be reversely changed to provide for lateral control. Moreover as the center of lifting effort of the supporting surfaces is located in the rear of their pivotal points and the curvature of such planes is so calculated that such distance increases with an increase in the angle of incidence it follows that there is an automatic action of the planes in tending to return to a balanced condition, this being transmitted through the connection 49 which forms a part of the operator's control, whereby he is enabled when he so desires to supplement or to nullify such automatic action by the movement of his body.

The travelers 46 have nuts 53 which work on the oppositely threaded longitudinal worms 54, carried on the guides 45, each worm having thereon a sprocket 55 over which pass chains 55$^a$ to the sprocket wheel 56 upon the longitudinal shaft 57 located in the center of the fuselage. By an angular movement of this shaft the travelers can be given a longitudinal movement in the fuselage and as the worms, of the two worm shafts are similarly threaded the travelers will be given similar movements upon the angular movement of the center shaft. By this construction the system comprising the wheels 47 and the sprocket chains 48 will be shifted longitudinally of the fuselage and with such shifting the angle of incidence of the front planes will be correspondingly and directly varied, this providing for variation in the angle of incidence during flight at the will of the operator to provide for changes in the lift and drift.

From the rear end of each traveler a wire 58 runs to the central joint of one of two pairs of toggles 59, the opposite members of which are attached to the fuselage and the rear of the rear supporting surface 14 whereby a forward movement of the travelers cause a straightening of the toggles and a change of the angle of incidence of the rear plane the same as or in some ratio corresponding to the change of the angle of incidence of the front supporting surfaces. While the lifting effort of the rear plane tends to bend the toggle, in order to prevent the flapping of the rear plane and to hold it in minimum angle, we provide each toggle with a spring 60 tending to close it.

Mounted transversely of the fuselage immediately beneath the operator's seat 61$^a$ is the elevator controlling shaft 61 having thereon the hand wheel 62 located on the left of the operator. This shaft has upon its opposite ends sprocket wheels 63 over which sprocket chains 64 attached to the two sets of elevator control wires 39 are connected. This gives the operator control of the elevator. Sleeved on the elevator operating shaft to the right of the operator's seat is the hand wheel 65 having on the hub thereof a sprocket 66 connected by a twisted sprocket-chain 67 with the wheel 67$^a$ on the longitudinal shaft 57 before described as located in the center of the fuselage and connected with the worms actuating the travelers. This wheel therefore serves the function of shifting the angle of incidence of the planes and obviously this can be done while in flight. Outside of the angle of incidence controlling wheel 65 and mounted on the elevator controlling shaft is the tubular shaft 68 having fixed on its inner end the rudder hand wheel 69. A corresponding tubular shaft 68$^a$ is located upon the other end of the elevator shaft and the two are connected together by the counter shaft 70 located beneath the seat by the sprocket chains 71. Each of the tubular shafts 68 and 68$^a$ has on its outer end a sprocket wheel 72 over each of which pass sprocket chains 73 connected to the two pairs of rudder controlled wires 44. These opposite sprockets are therefore moved by the movement of the rudder hand wheel and corresponding motions are imparted to the rudder planes. In order to indicate to the operator when these various hand wheels are in their neutral position, they may be provided with suitable designating characteristics which may be readily observed by him.

In order to provide supplemental lateral controlling means I mount upon the outer ends of each of the forward supporting surface 13 ailerons 74 which are distinguished from the prior art in that the axis upon which they turn are diagonally placed in respect to the line of flight. The mounting of these ailerons is accomplished in the manner shown in Fig. 4 by extending the rear longitudinal beams 19, of the frame of the forward supporting surface beyond the front beams thereof and placing upon the ends of these beams bearings 75 upon which the ailerons are pivoted. The axes of movement of the ailerons are slightly in the rear of the front edges thereof, and therefore forward of the centers of pressure thereon, the front edges of the ailerons being curved to give a better entering edge, whereby a balancing effect is obtained and the labor of shifting the aileron reduced. A suitable yoke 76 is mounted upon each aileron across its axial line, being braced by stay wires 77, and to its ends are connected the aileron controlling wires 78—79. The top controlling wire 78 of one aileron is led diagonally backward over the top of the corresponding front supporting surface and passed over a suitable guide, located along the rear longitudinal beam thereof, to the bottom of supporting surface. The bottom controlling wire 79 of the aileron is led along the bottom of the same surface to a guide located adjacent to where the upper wire 78 passes through the surface and thence both wires are lead to fair-leaders 82 located on the strut structure of the surface immediately adjacent to its pivotal point. The opposite aileron is similarly wired and the bottom wires 79 of the two ailerons are directly connected together. The top wires 78 of the two ailerons are led over guides located on the fuselage and are connected with the shoulder yoke 52 so that any inclination of the body of the aviator to one side will raise the aileron on the side to which he inclines. This inclination of the aileron as is well known tends to restore the lateral balance of the machine. The diagonal pivoting of the aileron accomplishes a result which has not heretofore been accomplished by ailerons pivoted at the normal to the line of drift in that the pressure upon the raised aileron is not only due to the drift pressure of the machine, but also due to the side pressure resulting from air currents acting on the windward side of the machine. Inasmuch as the general result of side wind currents tends to lift the windward side of the machine the raised aileron on that side receives a pressure which is the resultant of the drift pressure and the pressure of the side wind, which resultant is greater than the drift pressure and which tends to lower that side of the machine. The lowered aileron, which is on the leeward side, is masked from the action of the side wind to a great extent by the frictional resistance offered by the front surfaces and hence the pressure exerted thereon is practically only that due to the drift pressure and hence the excess of pressure on the windward side tends to assist in righting the machine. This location of the ailerons with their projected area transversely of the machine tends to pick the machine up and prevent sliding in banking. The normal position of the ailerons is subsequently neutral, that is to say, they are without lifting effort. It will be noted, however, that due to the connections of the opposite aileron, they will be simultaneously, but reversely moved, whereby their area as projected at right angles to the axis of the machine, is maintained identical with each other, and the symmetry of the machine as to drift pressure is preserved.

In the forward portion of the fuselage immediately in the rear of the operator's seat is located an intermediate platform 84 carried by the vertical members of the fuselage, on which is mounted the driving mechanism 85 for the propeller shaft 87, the propeller thus revolving within a cage formed by the fuselage and being located at about the rear edges of the forward supporting surfaces and between and below them.

In the fuselage between the propeller and the rudder is mounted a cellular structure over the rear supporting plane 14, this cellular structure comprising vertical side walls 88 and a top wall 89 and a bottom wall which may be the top of the rear supporting surface. In addition to the outside vertical wall, the cellular structure is provided with one or more vertical partition walls 90. This structure receives the agitated air driven rearwardly from the propeller and which had more or less of a rotary motion, and is so designed that the pressure due to such rotary movement of the air tends to neutralize the dynamic effort of the engine due to the reaction between the propeller blades and the air and thus tends to neutralize the effect of the propeller tending to turn the aeroplane around the propeller shaft. This section also tends to straighten out the air current and to destroy the turbulent condition thereof, whereby the air issuing from this cellular structure and flowing to the rudders and elevators is given parallel stream line, preventing disturbance which would otherwise occur. The horizontal outside faces of the walls of the cellular structure also act as lateral stabilizing surfaces and in aiding in directional stability and in side winds tend to head the machine into the wind. It will be noted that certain of the walls of the cellular structure are at angles to the rotation of air set up by the propeller, and that such rotating air entering the cellular structure will by striking the inside of one of the outer walls thereof be confined therein and be deflected to strike, substantially at a normal one of the other walls, whereby its motion will be destroyed and that the vertical middle wall 90, radial to the propeller, intercepts the air current near the axis of the propeller and further prevents the setting up of a rotating body of air in the cellular structure.

Immediately below the platform 84 is located the main gasolene supply 85ª having the sump portion 86 from which the oil may be power fed to small auxiliary gravity tank 85ᵇ located above the engine carbureter.

For the purpose of taking up the pressures from the power plant resulting from landing, posts 88ᵐ are located on each side of the engine within the fuselage between the top and bottom horizontal members thereof, and from the base of such posts, struts 89 are inclined downwardly and outwardly to the skid structure whereby the thrust resulting from the engine in landing are transmitted therethrough to the skid at the point of resistance. The rear posts are slightly farther apart that the front posts and immediately outside and at the top thereof I have shown radiators 90ᵐ, the flat faces of which are across the machine.

In order to provide an emergency brake, we may use the mechanism shown in Figs. 9, 13 and 14. As there shown each end of the axle 7 has mounted thereon a loop 91 which straddles the wheel thereon and carries the rear of a band 92 say of canvas, the forward end of which is connected to a halyard 93, passing through a guide 94 on the runner ahead of the wheel, the halyard being brought up to where it is under the control of the operator and where it may be held against movement in any suitable way. The loops are thrown rearwardly by springs 95 and when the halyards are released the loops drop the bands upon the ground in front of the wheels, which run thereover, the bands being thus interposed between the wheels and ground. This rearward movement of the bands is arrested by knots 93ª or other enlargement on the halyard, engaging the guide 94ª and the braking strain is therefore transmitted directly to the skid system.

The machine here described is so designed that the line of thrust and line of projected area or drift pressure and line of center of head resistance are coincident; that the center of gravity is located at, or by preference slightly below these coincident lines, and that the center of lifting effort of the sustaining planes is located in the line of thrust slightly forward of the center of gravity whereby in flight the elevator may be called up to furnish lifting effort to maintain the proper horizontal heading of the machine, and the general design of the machine is such that should the operator lose control and the engine stop, the machine would tend to descend in a series of glides and recoveries.

The hereinbefore described location of the center of gravity at a point slightly below the center of head resistance serves an important function in the automatic control of the machine. Thus if for any reason there should be an increase in head resistance tending to slow the machine down, the point of application of such resistance would be above the center of mass of the machine and the momentum of the machine as exerted at the point of mass would therefore tend to head the machine up, thus increasing the angle between the planes and the line of movement, thereby automatically increasing the lifting effort to counteract the decrease in the drift of the machine, while on a decrease of head resistance, the opposite effect will be produced, thus causing the machine to maintain a uniform elevation in spite of variation in speed due to such head resistance.

We have found by the actual flying of a machine constructed in accordance to the general lines here set forth that the supporting surfaces function to the greatest advantage when given the contour of a cissoid of Diocles, the formula of which is well known as $$y^2 = \frac{x^3}{2a-x}$$

in which "$2a$" represents the diameter of the generating circle and $x$ and $y$ ordinates parallel and normal thereto respectively. In designing the surface the diameter "$a$" of the generating circle will be varied inversely with the speed at which the machine is designed to fly, and the entering edge will be the vertex of the curve. We have found that with this curve, by properly selecting the pivotal point, the desired close relation of the center of pressure on the plane to the axial point, together with the backward movement of the center of pressure on increase of the angle of incidence, may be obtained.

Having thus described our invention what we claim is:

1. A supporting surface for a flying machine having a fore and aft curvature, the curvature being a cissoid of Diocles.

2. A supporting surface for a flying machine having a fore and aft curvature, the curvature being a cissoid of Diocles, the vertex of which forms the entering edge of the surface.

3. A member adapted to react with an aero-form fluid having its curvature that of the cissoid of Diocles, the vertex of the cissoid forming the entering edge.

4. In a flying machine, stabilizing surfaces on opposite sides thereof, each surface consisting of an aileron, the pivotal axis of which is forward of the center of pressure therein, and at an angle to the line of drift, the said axes of the two surfaces converging forwardly, and a connection between the two surfaces whereby they are moved together but reversely, and their respective projected areas at right angles to the line of drift maintained identical.

5. In a flying machine, the combination with a propeller, of a cellular structure located in the rear of the propeller and having a fixed fore and aft wall therein located at an angle to the rotation of the air currents set up by the propeller to receive air from the propeller and neutralize the torque reaction of the propeller.

6. In a flying machine the combination with a propeller, of fixed fore and aft walls located in the rear thereof and at an angle to each other, and to the rotation of the air set up by the propeller, the said walls forming a channel to receive air from the propeller, in which the torque reaction of the propeller is neutralized.

7. In a flying machine, the combination with a propeller, of a guiding surface in the rear thereof, and fore and aft walls located between the propeller and guiding surface, at an angle to each other and to the rotation of the air set up by the propeller, the said walls forming channels to receive air from the propeller and to destroy the rotary motion thereof before delivering it to the guiding surface.

8. In a flying machine, the combination with a propeller, a guiding surface in the rear thereof, and walls transverse to the direction of the rotation of the air set up by the propeller located between the propeller and the guiding surface.

9. In a flying machine, the combination with a propeller, a guiding surface in the rear thereof and vertical and horizontal walls transverse to the direction of the rotation of the air set up by the propeller located between the propeller and the guiding surface.

10. In a flying machine, the combination with a propeller, of fixed correcting and stabilizing walls located in the rear thereof and at an angle to the rotation of the air currents set up by the propeller to receive air from the propeller and neutralize the torque reaction of the propeller.

11. In a flying machine, the combination with two pivoted sustaining surfaces whose respective pivotal points are in the rear of their forward edges whose center of pressure are in the rear of their pivotal points and in which the distance between their center of pressure and their pivotal points increase with an increase of angle of incidence of the surfaces, and a connection between the surfaces whereby the resultant tendencies of the two surfaces to return to neutral position are balanced against each other.

12. In a flying machine, the combination with a fuselage, of a front supporting surface on each side thereof, each supporting surface consisting of a vertical truss structure and a horizontal frame structure rigidly connected, pivotal connections between the fuselage and the surfaces, and a connection between the truss structures of the opposite surfaces across the fuselage, whereby the tilting tendency of the surfaces on their pivots are balanced substantially as described.

13. In a flying machine, the combination of a fuselage, forward supporting surfaces pivoted thereto for change in their angle of incidence, travelers on each side of the fuselage, a connection between each surface and the corresponding traveler and means for simultaneously imparting a fore and aft movement to the travelers and additional means for reversely changing the point of connection between each traveler and the corresponding plane.

14. In a flying machine, the combination of a fuselage, forward supporting surfaces pivoted thereto for change in the angle of incidence, travelers on each side of the fuselage, a connection between each surface and the corresponding traveler and means for simultaneously imparting a fore and aft movement to the travelers and additional means for reversely changing the point of connection between each traveler and the corresponding surface, a pivoted rear supporting surface and a connection between the travelers and the rear supporting surface for effecting a change in the angle of incidence thereof simultaneously with the motion of the travelers.

15. A supporting surface for a flying machine comprising a vertical truss part and a horizontal frame part, the ends of the two parts being stayed together, a thrust bearing in the vertical truss part, and a truss in the horizontal framed part transmitting compression strains directly to thrust bearing.

16. In a flying machine the combination with pivotal sustaining surfaces and with a rudder and elevator, an operator's seat, a shaft having a hand wheel thereon adjacent to the said seat and controlling the elevator, a sleeve thereon having a wheel adjacent to the seat of the operator, controlling the rudder, a wheel upon the said shaft for similarly varying the angle of incidence of the sustaining surfaces, a shoulder yoke behind and above the seat of the operator and mechanism connected to the shoulder yoke for reversely controlling the angle of incidence of the surfaces.

17. In a flying machine, the combination with a pair of rigid sustaining surfaces, pivoted forward of their center of pressure, of means actuated by excess of pressure on one surface to tilt the other opposite surface to equalize the lifting action of the surfaces, means for destroying the equality of the lifting action of surfaces in flight at will, and means constantly tending to restore said surfaces to normal positions when shifted therefrom.

In testimony whereof we have signed our names in presence of two witnesses.

RUDOLPH R. GRANT.
CHARLES O. MORSE.

Witnesses:
E. GRIFFITH DODSON,
V. M. DORSEY.